(12) United States Patent
Sahu et al.

(10) Patent No.: US 11,697,719 B2
(45) Date of Patent: Jul. 11, 2023

(54) METHOD FOR ENHANCED BONDING OF THERMOPLASTIC COMPOSITES

(71) Applicant: The Boeing Company, Chicago, IL (US)

(72) Inventors: Megha Sahu, Bangalore (IN); Om Prakash, Bangalore (IN); Shantanu Bhattacharya, Kanpur (IN); Poonam Sundriyal, Kanpur (IN)

(73) Assignee: The Boeing Company, Chicago, IL (US)

( * ) Notice: Subject to any disclaimer, the term of this patent is extended or adjusted under 35 U.S.C. 154(b) by 396 days.

(21) Appl. No.: 16/806,767

(22) Filed: Mar. 2, 2020

(65) Prior Publication Data

US 2021/0269608 A1  Sep. 2, 2021

(51) Int. Cl.
*C08J 7/043* (2020.01)
*B05D 3/14* (2006.01)
*C08J 5/12* (2006.01)

(52) U.S. Cl.
CPC .............. *C08J 7/043* (2020.01); *B05D 3/148* (2013.01); *C08J 5/124* (2013.01); *C08J 2371/00* (2013.01); *C08J 2463/00* (2013.01)

(58) Field of Classification Search
CPC . B29C 65/48; B29C 65/4805; B29C 65/4855; B29C 65/52; B29C 66/71; B05D 3/148; C08J 2371/00; C08J 5/124; C08J 7/043
See application file for complete search history.

(56) References Cited

U.S. PATENT DOCUMENTS

| | | | |
|---|---|---|---|
| 8,197,938 B2* | 6/2012 | Linemann | C08J 5/124 428/476.1 |
| 8,632,651 B1* | 1/2014 | Hicks | B29C 66/54 156/272.2 |
| 8,702,892 B2* | 4/2014 | Arber | C09J 5/02 156/275.7 |
| 2009/0227755 A1 | 9/2009 | DeVoe et al. | |
| 2010/0092765 A1 | 4/2010 | Hager et al. | |
| 2019/0134963 A1* | 5/2019 | Hara | B32B 27/34 |

FOREIGN PATENT DOCUMENTS

JP    2017-210621    11/2017

OTHER PUBLICATIONS

Extended European Search Report dated Sep. 17, 2021 in corresponding European application No. 21158970.0.
(Continued)

*Primary Examiner* — Michael P Wieczorek
(74) *Attorney, Agent, or Firm* — Quinn IP Law

(57) ABSTRACT

The present disclosure provides a method of enhancing the shelf-life of an activated surface of a thermoplastic material, including: coating at least a portion of a surface of the thermoplastic material with at least one adhesion promoter to provide a coated surface; and treating the coated surface with plasma to provide the activated surface of the thermoplastic material; wherein the activated surface has a contact angle in the range of from about 0 to about 40°; and wherein the presence of the at least one adhesion promoter is effective to maintain the contact angle in the range of from about 0 to about 40° for a time of about 10 days or greater.

14 Claims, 7 Drawing Sheets

(a) Bare PEEK

(b) Plasma modification and PEG- Silane coating

(c) After drying

(56) References Cited

OTHER PUBLICATIONS

Ba, O. M., et al., "Surface composition XPS analysis of a plasma treated polystyrene: Evolution over long storage periods," *Colloids and Surfaces B: Biointerfaces*, 2016, vol. 145, pp. 1-7.
Guruvenket, S., et al., "Plasma surface modification of polystyrene and polyethylene," *Applied Surface Science*, 2004, vol. 236(1-4), pp. 278-284.
Inagaki, N., et al., "Surface modification of poly (aryl ether ether ketone) film by remote oxygen plasma," *Journal of Applied Polymer Science*, 1998, vol. 68(2), pp. 271-279.
Kim, Y., et al., "Plasma-enhanced atomic layer deposition of SiN—AlN composites for ultra-low wet etch rates in hydrofluoric acid," *ACS Applied Materials & Interfaces*, 2016, vol. 8(27), pp. 17599-17605.
Larson, B. J., et al., "Long-Term Reduction in Poly (dimethylsiloxane) Surface Hydrophobicity via Cold-Plasma Treatments," *Langmuir*, 2013, vol. 29(42), pp. 12990-12996.
Sanchis, M. R., et al., "Characterization of the surface changes and the aging effects of low-pressure nitrogen plasma treatment in a polyurethane film," *Polymer Testing*, 2008, vol. 27(1), pp. 75-83.

\* cited by examiner (a) Bare PEEK (b) Plasma modification and PEG-Silane coating (c) After drying

METHOD FOR ENHANCED BONDING OF THERMOPLASTIC COMPOSITES

BACKGROUND

Field of the Disclosure

The present disclosure relates to improvement of adhesion in thermoplastics, in particular, to thermoplastic materials exhibiting enhanced bonding characteristics and methods for providing enhanced bonding of thermoplastic composite materials.

Description of Related Art

Thermoplastic composite materials are used in a wide variety of applications. For example, thermoplastic composite materials are employed within aircrafts. Some example applications of thermoplastic composites within aerospace devices and aerospace vehicles such airplanes, rotocraft, drones, and other aircraft include the following: framing, flooring, and seats; wings and wing parts, control surfaces, fuselage panels, engine parts, and other like components and parts. It is desired to have efficient joining of composite structures for cost-effective manufacture of modern aerospace components and aerospace vehicles.

Thermoplastics pose challenges relative to adhesive bonding. The bonding quality greatly depends on surface energies of the thermoplastic materials, which is related to wetting angle/contact angle of the surface. Bonding effectiveness of a thermoplastic material can be enhanced by altering the surface of the thermoplastic material to provide a lower contact angle. Therefore, conventional bonding methods require specialized surface preparation and cleaning is necessary to obtain increased bonding.

Plasma treatment of thermoplastic surfaces is one known pre-treatment before adhesive bonding is applied. Plasma cleaning is the removal of impurities and contaminants from surfaces through the use of an energetic plasma or dielectric barrier discharge (DBD) plasma created from gaseous species. Gases such as argon and oxygen, as well as mixtures such as $CO_2$, O, ozone, other air components, and hydrogen/nitrogen are typically used. The plasma is created by using high frequency voltages to ionize the low pressure gas, although atmospheric pressure plasmas are also common. The plasma can then be used to interact with (i.e., clean) any surface placed in the plasma.

The use of plasma treatment as a precursor to adhesive bonding currently has issues related to shelf-life. In particular, samples subjected to conventional plasma pre-treatment processes have limited shelf-life with regard to retaining enhanced surface activity over a period of time, typically two weeks. The limited shelf-life prevents the use of plasma treatment as a widely used industrial process in manufacturing of thermoplastic composites and assemblies.

It would be advantageous to provide methods for enhancing the bonding capabilities of thermoplastic materials. In particular, it would be advantageous to provide pre-treatment processes for thermoplastic polymers which extend the shelf-life of plasma-treated thermoplastic materials (i.e., the shelf-life available for subsequent processes after the application of plasma).

SUMMARY

The disclosure provides thermoplastic materials exhibiting an enhanced shelf-life for subsequent bonding processes after the thermoplastic material has been treated with plasma. Methods for enhancing the shelf-life for subsequent bonding processes after a thermoplastic material has been treated with plasma are also provided herein.

Treating the surface of a thermoplastic material with plasma can enhance the bonding of the thermoplastic material in composite structures. However, such pre-treated samples have limited shelf-life in regard to retaining the enhanced surface activity over a period of time, typically two weeks. The current disclosure demonstrates a capping mechanism of plasma-treated thermoplastic surfaces with a layer of thin adhesion promoter coating, which restricts the plasma treated surface from recovery processes and increases the shelf-life of such polymers.

The present disclosure includes, without limitation the following embodiments.

Embodiment 1: A method of enhancing the shelf-life of an activated surface of a thermoplastic material, comprising: coating at least a portion of a surface of the thermoplastic material with at least one adhesion promoter to provide a coated surface; and treating the coated surface with plasma to provide the activated surface of the thermoplastic material; wherein the activated surface has a contact angle in the range of from about 0 to about 40°; and wherein the presence of the at least one adhesion promoter is effective to maintain the contact angle in the range of from about 0 to about 40° for a time of about 10 days or greater.

Embodiment 2: The method of the preceding embodiment, wherein the at least one adhesion promoter is selected from the group consisting of: PEG-silane, polyvinyl alcohol (PVA), 3-Glycidoxypropyl methyldimethoxysilane, 3-Chloropropyltrimethoxysilane, vinyltriethoxysilane, zirconium acetylacetonate, and combinations thereof.

Embodiment 3: The method of any preceding embodiment, wherein the at least one adhesion promoter is PEG-silane.

Embodiment 4: The method of any preceding embodiment, wherein the presence of the at least one adhesion promoter is effective to maintain the contact angle in the range of from about 0 to about 40° for a time of about 15 days or greater.

Embodiment 5: The method of any preceding embodiment, wherein the presence of the at least one adhesion promoter is effective to maintain the contact angle in the range of from about 0 to about 40° for a time of about 25 days or greater.

Embodiment 6: The method of any preceding embodiment, wherein the coated surface has an adhesion promoter coating layer having a thickness of from about 2 to about 12 microns.

Embodiment 7: The method of any preceding embodiment, wherein the thermoplastic polymer material is polyether ether ketone.

Embodiment 8: A thermoplastic polymer material having at least one activated surface prepared according to the method of any preceding embodiment.

Embodiment 9: A method of forming a thermoplastic composite structure, comprising: providing a first thermoplastic part and a second thermoplastic part; coating at least a portion of a surface of the first thermoplastic part with at least one adhesion promoter to provide a coated surface; treating the coated surface with plasma to provide an activated surface; and bonding the first thermoplastic part and the second thermoplastic part at the activated surface with at least one adhesive to form the thermoplastic composite structure; wherein the activated surface has a contact angle in the range of from about 0 to about 40°; and wherein the presence of the at least one adhesion promoter is effective to maintain the contact angle in the range of from about 0 to about 40° for a time of about 10 days or greater.

Embodiment 10: The method of any preceding embodiment, wherein the at least one adhesion promoter is selected from the group consisting of PEG-silane, polyvinyl alcohol (PVA), 3-Glycidoxypropyl methyldimethoxysilane, 3-Chloropropyltrimethoxysilane, vinyltriethoxysilane, zirconium acetylacetonate, and like materials, and combinations thereof.

Embodiment 11: The method of any preceding embodiment, wherein the thermoplastic composite structure has a bond strength of from about 20 to about 30 MPa.

Embodiment 12: The method of any preceding embodiment, wherein the at least one adhesive material is epoxy.

Embodiment 13: The method of any preceding embodiment, further comprising: coating at least a portion of a surface of the second thermoplastic part with at least one adhesion promoter to provide a coated surface; treating the coated surface with plasma to provide a second activated surface; and bonding the first thermoplastic part and the second thermoplastic part such that the activated surface is adjacent to and facing the second activated surface at the bond; wherein the second activated surface has a second contact angle in the range of from about 0 to about 40°; and wherein the presence of the at least one adhesion promoter is effective to maintain the second contact angle in the range of from about 0 to about 40° for a time of about 10 days or greater.

Embodiment 14: The method of any preceding embodiment, wherein the first thermoplastic part comprises polyether ether ketone.

Embodiment 15: The method of any preceding embodiment, wherein the second thermoplastic part comprises polyether ether ketone.

Embodiment 16: The method of any preceding embodiment, wherein the at least one adhesion promoter is a silane.

Embodiment 17: A thermoplastic structure formed according to the method of any preceding embodiment.

Embodiment 18: The thermoplastic structure of any preceding embodiment, wherein the thermoplastic composite structure is configured for use in an aircraft.

These and other features, aspects, and advantages of the present disclosure will be apparent from a reading of the following detailed description together with the accompanying drawings, which are briefly described below. The present disclosure includes any combination of two, three, four, or more embodiments, features, or elements set forth in this disclosure, regardless of whether such embodiments, features, or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those herein summarized. Further, other aspects and advantages of such embodiments disclosed herein will become apparent from the following detailed description taken in conjunction with the accompanying drawings which illustrate, by way of example, the principles of the described aspects.

BRIEF DESCRIPTION OF THE DRAWINGS

Figure 1:
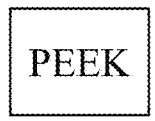
Figure 1:
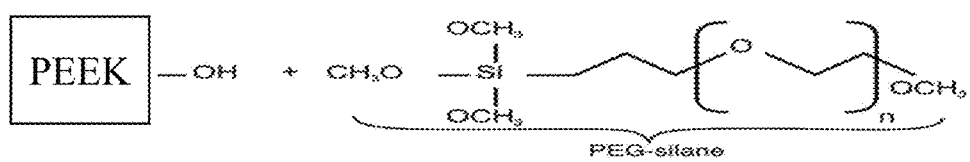
Figure 1:
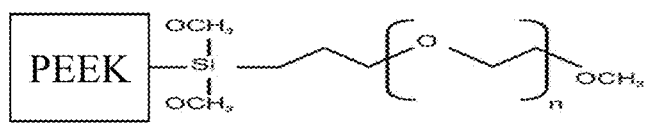
Figure 2:
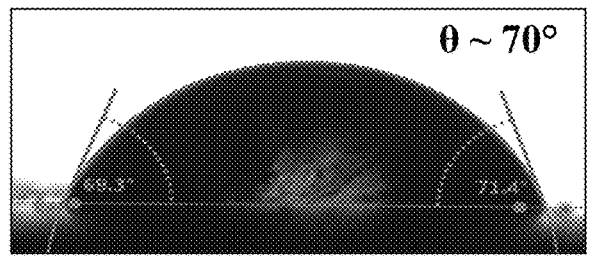
Figure 4:
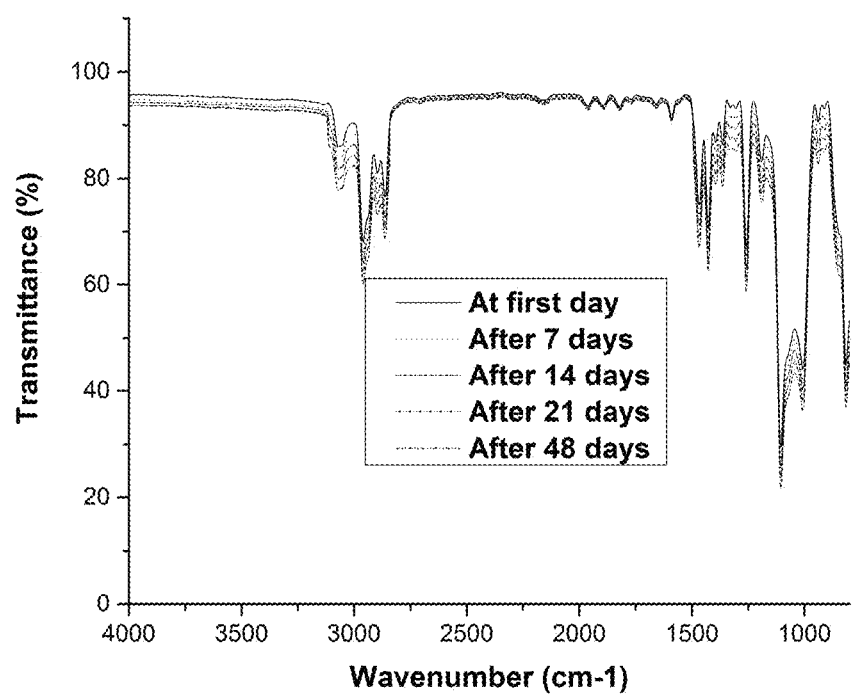
Figure 5:
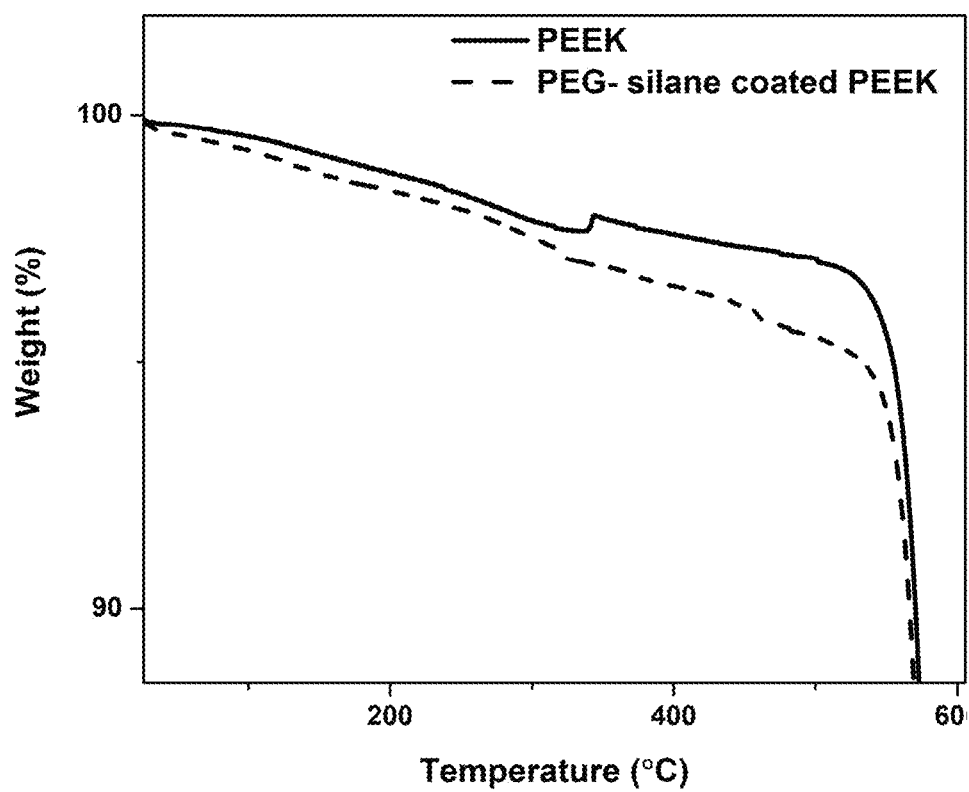
Figure 6:
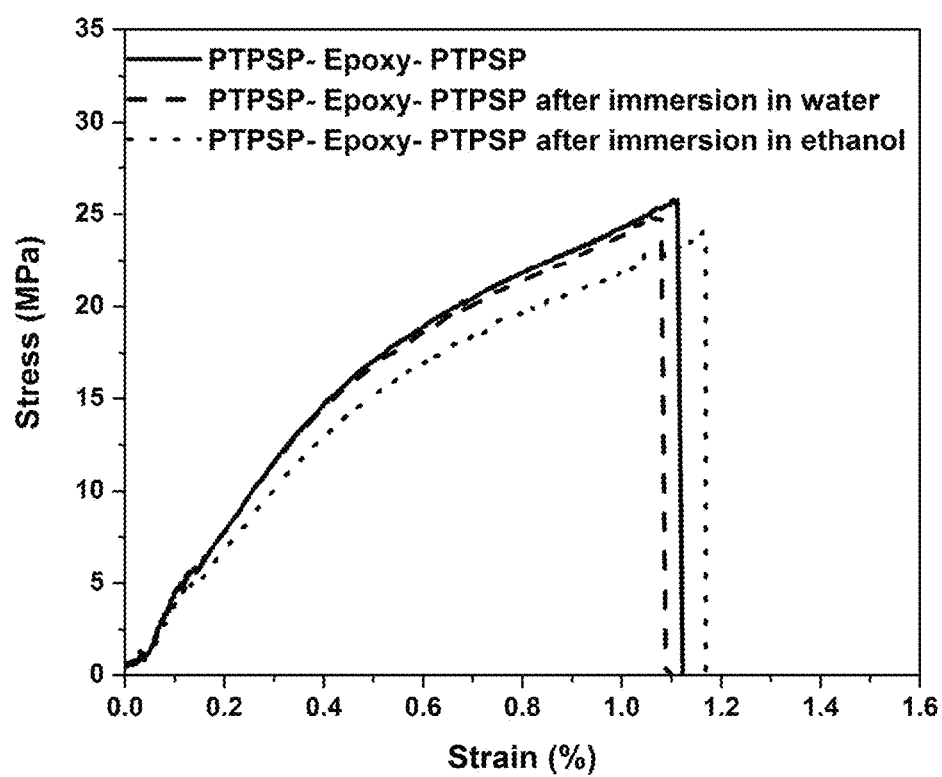
Figure 7A:
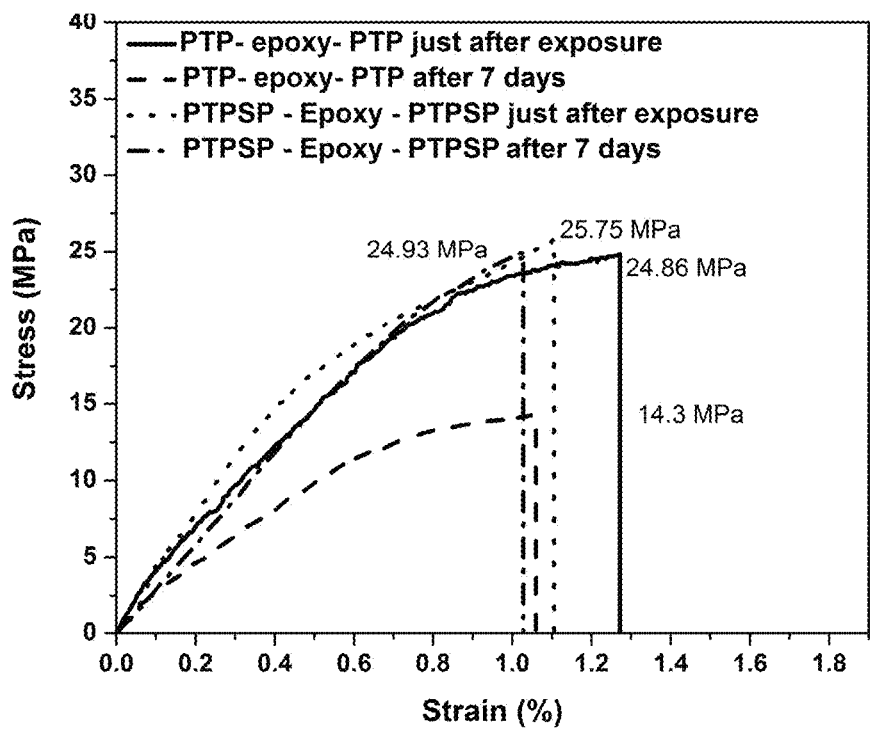
Figure 7B:
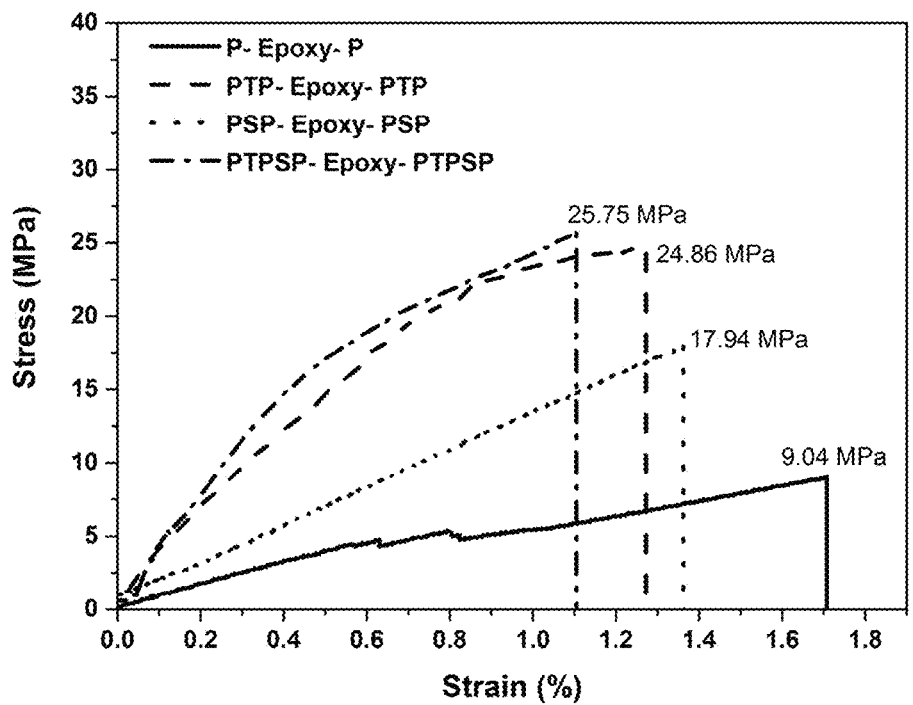

Having thus described the disclosure in general terms, reference will now be made to the accompanying drawings, which are not necessarily drawn to scale, and wherein:

FIG. 1 is a block diagram of the mechanism involved in embodiments of the thermoplastic treatment methods described herein;

FIG. 2 illustrates the surface contact angle of an untreated PEEK sample;

FIGS. 3(a)-3(h) illustrate the time dependent change in the contact angles of the: (a-b) plasma treated control PEEK sample and (c-h) PEG-silane and plasma treated inventive PEEK sample according to an embodiment of the present disclosure;

FIG. 4 is an ATR-FTIR spectra of a PEG-silane and plasma treated PEEK sample according to an embodiment of the present disclosure at different time instants;

FIG. 5 shows comparative Thermal Gravimetric Analysis (TGA) plots for a control PEEK sample and a PEG-silane coated PEEK sample according to an embodiment of the present disclosure;

FIG. 6 is a stress-strain diagram of a PTPSP (Plasma treated and PEG-Silane coated PEEK)-Epoxy-PTPSP joint and the effect of water/ethanol immersion on the stress-strain curves;

FIGS. 7(a) and 7(b) are stress-strain diagrams showing the bond strength of different PEEK samples; and FIGS. 8(a)-(d) show FESEM images of different PEEK samples.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Thermoplastics are difficult to join using adhesive bonding alone. Plasma treatment technologies are used to activate (i.e., clean) the surface of a thermoplastic material such that the bonding characteristics of the thermoplastic material are enhanced. However as noted herein above, the activated surface retains the activity for a very limited time and there is a need to extend the shelf-life of the activated surface. Without being limited by theory, extending the shelf-life of the plasma treatment, which provides an activated surface of the treated material, can allow for better alignment with time scales relevant for industrial manufacturing practice. For example, conventional plasma treated samples should be used (i.e., subjected to any desired processes such as bonding following the plasma treatment) within 7-10 days, thereby limiting the application of the plasma treatment. As described in more detail herein below, the present disclosure provides thermoplastic materials exhibiting an activated surface of 10 days or longer, methods for extending the shelf-life of a plasma-activated surface, and methods for forming composite structures exhibiting an enhanced bonding strength.

As noted herein above, the bonding characteristics of a thermoplastic material are related to the contact angle of the surface of the thermoplastic material. Bonding effectiveness of a thermoplastic material can be enhanced by altering the surface of the thermoplastic material to provide a lower contact angle. Low contact angles are generally desired for good bonding strength. Plasma treatment is effective to lower the surface contact angle of a thermoplastic material. Methods of the present disclosure can include any plasma treatment process known in the art to provide an activated surface of a thermoplastic material. See, e.g., inagaki, N., Tasaka, S., Horiuchi, T., & Suyama, R. (1998). Surface modification of poly (aryl ether ether ketone) film by remote oxygen plasma. Journal of applied polymer science, 68(2), 271-279; Larson, B. J., Gillmor; S. D., Braun, J. M.; Cruz-Barba, L. E., Savage, D. E., Denes, F. S., & Lagally, M. G. (2013), Long-Term Reduction in Poly (dimethylsiloxane) Surface Hydrophobicity via Cold-Plasma Treatments. Langmuir, 29(42), 12990-129% Ba, O. M., Marmey, P., Anselme, K., Duncan, A. C.; & Ponche; A. (2016). Surface composition XI'S analysis of a plasma treated polystyrene: Evolution over long storage periods. Colloids and Surfaces B: Biointerfaces, 145, 1-7; Kim, Y. Provine, J., Walch, S. P. Park, J., Phuthong, W., Dadlani, A., L., & Prinz, F. B. (2016). Plasma-enhanced atomic layer deposition of $SiN_xAlN$ composites for ultra-low wet etch rates in hydrofluoric acid. ACS applied materials & interfaces, 8(27), 17599-17605; Guruvenket, S., Rao, G. M., Komath, M., & Raichur, A. M. (2004). Plasma surface modification of polystyrene and polyethylene. Applied Surface Science, 236(1-4), 278-284; and Sanchis, M. R., Calvo, O., Fenollar, O., Garcia, D., & Balart, R. (2008). Characterization of the surface changes and the aging effects of low-pressure nitrogen plasma treatment in a polyurethane film. Polymer testing, 27(1), 75-83; each of which are herein incorporated by reference.

Good bonding strength of a thermoplastic material can be achieved for thermoplastic materials having a surface contact angle in the range of from about 0 to about 40°. In various embodiments of the present disclosure, the activated surface of a plasma-treated thermoplastic material can have a surface contact angle in the range of from about 0 to about 40°, from about 5 to about 35°, from about 10 to about 33°, from about 10 to about 31°, or from about 10 to about 30°. In some embodiments, the activated surface of a plasma-treated thermoplastic material can have a surface contact angle of about 40° or less, about 35° or less, about 33° or less, about 31° or less, or about 30° or less.

Figure 3:
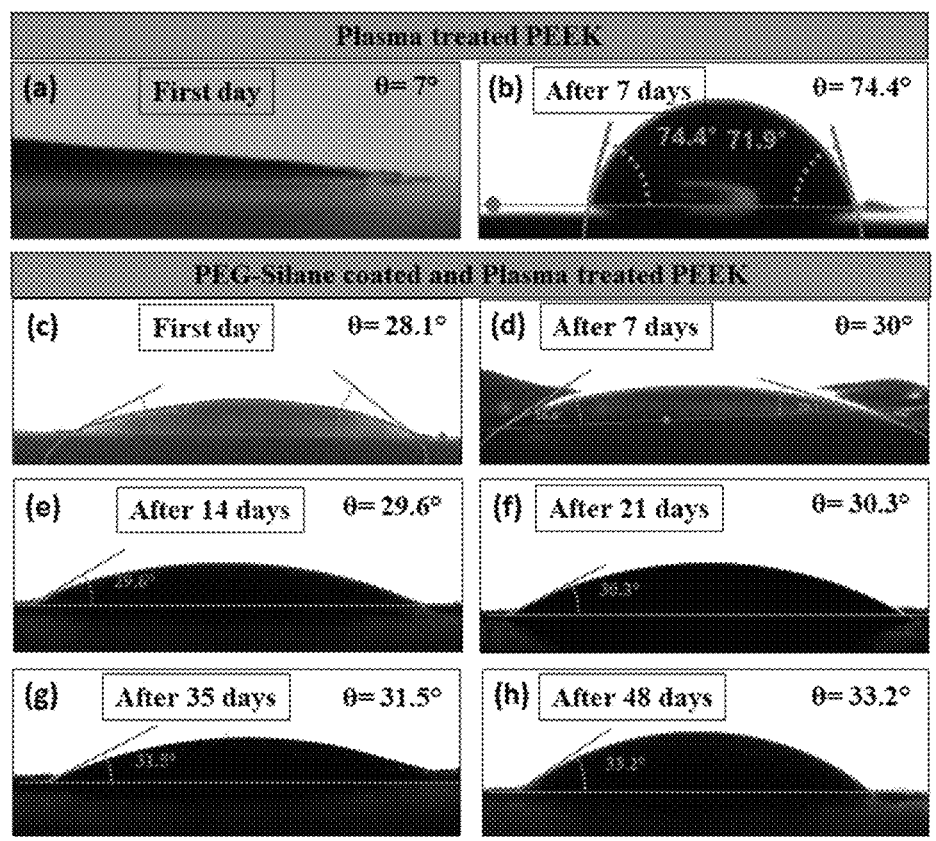

FIG. 2, for example, illustrates the surface contact angle of an untreated polyether ether ketone (PEEK) sample. The untreated PEEK surface is mildly hydrophobic (contact angle 70 degrees). As illustrated in FIG. 3, and described in Example 1 below, a plasma-treated PEEK surface exhibits a contact angle of about 10°, but the same degrades back to contact angle of 70° in 7 days time.

It was discovered that thermoplastic materials treated with an adhesion promoter prior to the plasma treatment exhibit an extended shelf-life of the plasma-activated surface. As illustrated in FIG. 3 and described in Example 1 below, for example, a plasma-treated PEEK sample that was first coated with a thin layer of PEG-silane adhesion promoter demonstrated a contact angle of about 30° for a duration as long as 7 weeks. For example, FIG. 3 shows the contact angle of a sample prepared according to an embodiment of the present disclosure staying at 29.6° after 14 days (FIG. 3 (e)), contact angle of 30.3° after 21 days (FIG. 3 (f)), contact angle of 31.5° after 35 days (FIG. 3 (g)), and contact angle of 33.2° after 48 days (FIG. 3(h)). As used herein, an "adhesion promoter" refers to materials that can serve as a coating layer with promotion for interlayer adhesion of thermoplastic materials. In some embodiments, the adhesion promoter can have brush polymer-like properties, therefore having a tendency to form a dense structure at the interface of the surface of the thermoplastic material to be coated and thereby block the release of the short and long chain oligomers from the bulk of the coated thermoplastic polymer material. The surface adhesion depends on the functional groups present at the surface. The adhesion promoter promotes adhesion due to the steric hindrance provided by its structure and thus, retards the decay in the effects of plasma treatment. It is noted that the description and the examples of the present disclosure refer to treatment processes applied to polyether ether ketone (PEEK), however, the present disclosure is not intended to be limited to PEEK and the methods described herein are applicable to all thermoplastic materials and any additional materials capable of being subjected to a plasma treatment process. According to various embodiments, the modification of the surface of the thermoplastic polymer includes a chemical capping layer of an adhesion promoter (e.g., polyethylene glycol (PEG)-silane), which extends the time horizon for surface recovery of plasma exposed thermoplastic material surfaces.

FIG. 1 is a block diagram illustrating the mechanism involved in preparing an example thermoplastic material of the present disclosure. Treatment of a PEEK surface with plasma and a PEG-silane adhesion promoter enhances activation of the surface. Specifically, plasma enhances the availability of OH groups for bonding. The PEG-silane extends the availability of the OH groups to bond for a longer time by capping those groups. The long term stability of the plasma modified surfaces improves adhesion aspects with epoxy inter-layers for bond assemblies between thermoplastic polymer composites.

Figure 8A:
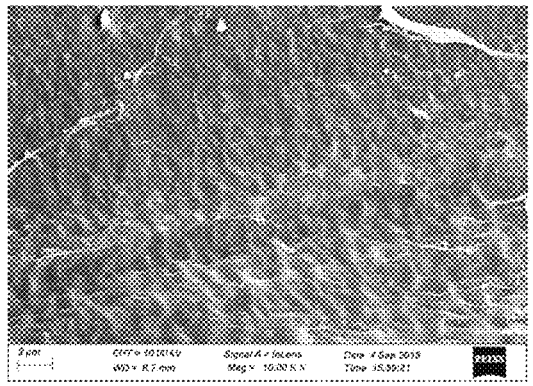
Figure 8B:
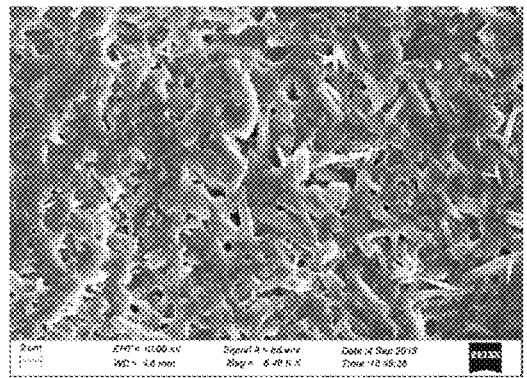
Figure 8C:
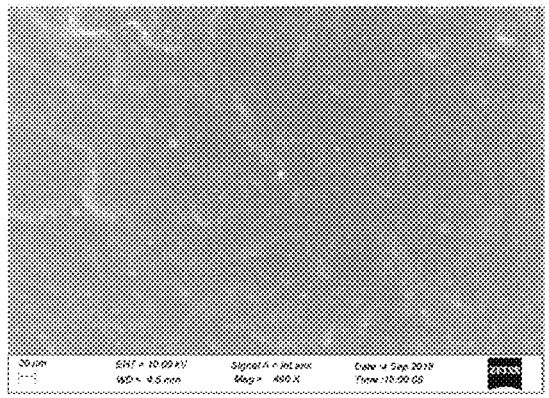
Figure 8D:
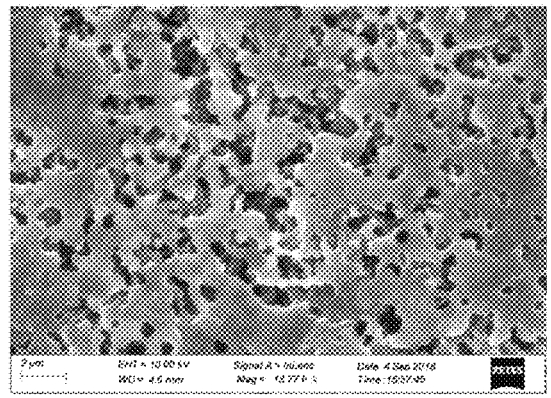

FIGS. 8(a)-(d) show FESEM images of different PEEK samples. FIG. 8(a) is as FESEM image of an untreated PEEK sample. FIG. 8(b) is an FESEM image of a plasma-treated PEEK sample. FIG. 8(c) is an FESEM image of a PEG-silane coated PEEK sample. FIG. 8(d) is an FESEM image of a plasma-treated and PEG-silane coated PEEK sample. FTIR spectra of the different PEEK samples show that the —OH and N—H groups are significantly increased after plasma treatment. With time, the —OH and N—H groups decrease in the plasma-treated PEEK sample (FIG. 8(b)) at a higher rate than in the plasma-treated and PEG-silane coated PEEK sample (FIG. 8(d)). FTIR spectra of the different PEEK samples also show that —CH groups are decreased at the surface following plasma treatment. With time, the —CH groups increased in the plasma-treated PEEK sample (FIG. 8(b)) at a higher rate than in the plasma-treated and PEG-silane coated PEEK sample (FIG. 8(d)).

In various embodiments of the present disclosure, the adhesion promoter can be selected from the group consisting of polyethylene glycol (PEG)-silane, polyvinyl alcohol (PVA), 3-Glycidoxypropyl methyldimethoxysilane, 3-Chloropropyltrimethoxysilane, vinyltriethoxysilane, zirconium acetylacetonate, and combinations thereof. In certain embodiments, the methods of the present disclosure include treating (e.g., coating) the surface of a thermoplastic polymer with PEG-silane prior to a subsequent plasma treatment.

In various embodiments, the presence of at least one adhesion promoter on a surface of a thermoplastic material subjected to a plasma treatment process is effective to maintain the contact angle of the plasma-treated thermoplastic material in the range of from about 0 to about 40°, from about 5 to about 35°, from about 10 to about 33°, or from about 10 to about 31° for a time of about 10 days or greater, about 15 days or greater, about 20 days or greater, about 25 days or greater, about 30 days or greater, about 35 days or greater, about 40 days or greater, or about 45 days or greater.

In various embodiments, the adhesion promoter coating can be applied to a surface of a thermoplastic polymer through a spin coating, dip coating, and/or spray coating process. In certain embodiments, the adhesion promoter can be applied to the surface of a thermoplastic polymer using a blade coating process and a vacuum desiccator. Correct thermal treatment can be used to ensure stability of the coating (e.g., drying the coatings for a period of 6-24 hours at an elevated temperature such as about 70-100° C.). In some embodiments, the adhesion promoter coating can be dried for a period of about 4-48 hours, or about 6-24 hours, or about 8-12 hours. In various embodiments, the adhesion promoter coating can be dried at a temperature of at least about 70° C., at least about 80° C., at least about 90° C., or at least about 100° C. The drying time and temperature for the correct thermal treatment can depend on, for example, the adhesion promoter selected, the thermoplastic material selected, and the thickness of the adhesion promoter coating.

In some embodiments, the thickness of the adhesion promoter film/coating on the surface of thermoplastic polymer after thermal treatment can be in the range of from about 2 to about 12 microns, from about 3 to about 10 microns, or from about 4 to about 10 microns. Detection of the adhesion promoter coating is possible through spectroscopic characterization of surfaces, for example.

The PEG-Silane coating can be applied over the Peek surfaces by using blade coating and vacuum desiccator. The films can also be dried for up to about 8 hr in an oven at a temperature of about 80° C., for example.

Thermoplastic materials prepared according to the present disclosure (i.e., coated with an adhesion promoter and then treated with plasma) exhibit an improved bond strength capability. Thermoplastic materials of the present disclosure can be used to prepare composite structures using any bonding methods known in the art. See, e.g., the processes described in Nash, N. H., Young, T. M., Mc Grail, P. T., & Stanley, W. F. (2015). Inclusion of a thermoplastic phase to improve impact and post-impact performances of carbon fibre reinforced thermosetting composites—A review. *Materials & Design*, 85, 582-597; Basturk S B. Development and mechanical characterization of anti-blast sandwich composites for explosive effect. PhD Thesis, Izmir Institute of Technology, Turkey, 2012; Ebnesajjad C. Theories of adhesion. In: Ebnesajjad C, editor. Surface treatment of materials for adhesive bonding. Elsevier Science; 2013; Petrie E M. Theories of adhesion. In: Petrie E M, editor. Handbook of adhesives and sealants. McGraw-Hill; 2000; Villegas, I. F., & van Moorleghem, R. (2018). Ultrasonic welding of carbon/epoxy and carbon/PEEK composites through a PEI thermoplastic coupling layer. *Composites Part A: Applied Science and Manufacturing*, 109, 75-83; Xie, L., Liu, H., Wu, W., Abliz, D., Duan, Y., & Li, D. (2016). Fusion bonding of thermosets composite structures with thermoplastic binder co-cure and prepare interlayer in electrical resistance welding. *Materials & Design*, 98, 143-149; Shi, H., Sinke, J., & Benedictus, R. (2017). Surface modification of PEEK by UV irradiation for direct co-curing with carbon fibre reinforced epoxy prepregs. *International Journal of Adhesion and Adhesives*, 73, 51-57; Benatar, A. and Gutowski, T. G. (1986). Methods for Fusion Bonding Thermoplastic Composites, SAMPE Quarterly. 18(1): 35-42; Border, J. and Salas, R. (1989). Induction Heated Joining of Thermoplastic Composites Without Metal Susceptors, 34th International SAMPE Symposium, pp. 2569-2578; Ageorges, C., Ye, L. and Hou, M. (2000). Experimental Investigation of the Resistance Welding for Thermoplastic-Matrix Composites. Part II: Optimum Processing Window and Mechanical Performance, Composites Science and Technology. 60: 1191-1202; S. Deng et al./Composites: Part A 68 (2015) 121-132 'Thermoplastic—epoxy interactions and their potential applications in joining composite structures—A review'; each of which are herein incorporated by reference.

In some embodiments, a thermoplastic material coated with an adhesion promoter and then treated with plasma can be used to form a composite structure having a bond strength of from about 20 to about 30 MPa, or from about 22 to about 27 MPa. It is noted that the current disclosure is applicable for all types of adhesive bonds. As such, bond strength can vary based on different parameters (e.g., materials being bonded, adhesive used to bond, etc.) and therefore applicable bond strengths may be outside of this range. In various embodiments, a thermoplastic material coated with an adhesion promoter and then treated with plasma can show an increase in bond strength, as compared to an untreated thermoplastic material, of at least about 10 MPa, at least about 15 MPa, or at least about 20 MPa.

Methods of preparing a thermoplastic material exhibiting an improved shelf-life of an activated surface are also provided herein. The methods can include coating at least a portion of a surface of the thermoplastic material with at least one adhesion promoter to provide a coated surface, and treating the coated surface with plasma to provide the activated surface of the thermoplastic material. As described above, an activated surface refers to a surface that provides enhanced adhesive bonding capabilities. The activated surface can be defined by a surface contact angle in the range of from about 0 to about 40°. In various embodiments of the methods described herein, the presence of the at least one adhesion promoter is effective to maintain the contact angle in the range of from about 0 to about 40° for a time of about 10 days or greater, about 15 days or greater, about 20 days or greater, about 30 days or greater, about 40 days or greater, or about 45 days or greater.

A method of forming a thermoplastic composite structure is also provided herein. The method can include providing a first thermoplastic part and a second thermoplastic part, coating at least a portion of a surface of the first thermoplastic part with at least one adhesion promoter to provide a coated surface, treating the coated surface with plasma to provide an activated surface, and bonding the first thermoplastic part and the second thermoplastic part at the activated surface with at least one adhesive to form the thermoplastic composite structure. Examples of adhesives include, but are not limited to, epoxy, polyurethane, acrylic, and like adhesives, and mixtures of different types of adhesives. It is noted that one or both of the first and thermoplastic part can be treated to have an activated surface. As such, the method of forming a thermoplastic composite structure can further include coating at least a portion of a surface of the second thermoplastic part with at least one adhesion promoter to provide a coated surface, and treating the coated surface with plasma to provide a second activated surface. The first thermoplastic part can be adhesively bound to the second thermoplastic part such that the activated surface of the first thermoplastic part is adjacent to and facing the activated surface of the second thermoplastic part. In other words, the adhesive material can be applied between two activated surfaces. As described herein above, the one or more activated surfaces can each have a contact angle in the range of from about 0 to about 40° and the presence of the at least one adhesion promoter can be effective to maintain the contact angle in the range of from about 0 to about 40° for a time of about 10 days or greater, about 15 days or greater, about 20 days or greater, about 30 days or greater, about 40 days or greater, or about 45 days or greater. Furthermore, the thermoplastic composite structure can have a bond strength of from about 20 to about 30 MPa. The thermoplastic composite structure can be configured for use in an aerospace vehicle.

EXAMPLES

The present disclosure can be more fully illustrated by the following examples, which are set forth to illustrate some embodiments of the present disclosure and are not to be construed as limiting thereof. All weight percentages are expressed on a dry weight basis, meaning water content is excluded, unless otherwise indicated.

Example 1

The contact angles of a control PEEK sample and an inventive PEEK sample subjected to a plasma treatment process were measured over time.

The inventive PEEK sample was first coated with a coating film of PEG-silane. A blade coating process was used to apply the coating layer over the inventive PEEK surface and the layer was subsequently dried at 80° C. for 8 hours. The thickness of the coating layer was 4 to 10 µm.

The control PEEK sample (i.e., having no PEG-silane coating) and the inventive PEEK sample (i.e., having a PEG-silane coating) were subjected to a nitrogen plasma treatment process. The parameters of the plasma treatment powers were the following: 20 Watt power, 100 m-torr pressure, and 60 sec duration. The plasma parameters are specific to nitrogen. However, similar chemistries can be easily induced on the thermoplastic surface with gases such as ammonia, oxygen, hydrogen, etc. by taking these gases into plasma states where the amide and hydroxide bonds on the surface can be initiated, thereby providing an increase the bond strength. The parametric optimization for the different gases can be independently carried out according to conventional plasma treatment methods.

FIGS. 3(a)-(h) show the time dependent change in the contact angles of the: (a-b) plasma-treated control PEEK sample and (c-h) the PEG-silane and plasma-treated inventive PEEK sample. FIG. 4 is an ATR-FTIR spectra of the PEG-silane and plasma treated inventive PEEK sample at different time instants. This figure shows the quantitative difference in the presence of various bonds due to plasma treatment. The PEG-silane coating increases the —OH functional groups on the PEEK surface and retains to the long term surface modification durability due to the steric hindrance effect emerged by its brush-like structure. As shown in FIG. 3(a), the contact angle of the control PEEK sample directly after the plasma treatment (i.e., time=0 days) was 7°. As shown in FIG. 3(b), the contact angle of the control PEEK sample 7 days after the plasma treatment was 74.4°. As shown in FIG. 3(c), the contact angle of the inventive PEEK sample directly after the plasma treatment (i.e., time=0 days) was 28.1°. As shown in FIGS. 3(d)-3(h), the contact angle of the inventive PEEK sample did not significantly change over time. As shown in FIG. 3(h), the contact angle of the control PEEK sample 48 days after the plasma treatment was 33.2°, which is still within the contact angle range representative of an activated surface (i.e., a contact angle in the range of about 0 to about 40°). The PEG-silane coating improves the durability of the modified PEEK surfaces due to steric hindrance provided from its brush-like nature. However, the PEG-silane coating increases the initial contact angles of the PEEK surfaces, which, without being limited by theory, may be due to the change in the surface roughness of the coated surface.

Accordingly, it is clear that the PEG-silane coating layer applied to the inventive PEEK sample prior to plasma treatment extended the time which the plasma-treated material maintained an activated surface (i.e., a surface having a contact angle in the range of 0-40°). Without being limited by theory, it is believed that the adhesion promoter monolayer alters the surface chemistry relative to plasma activation and helps retain hydrophilicity of the surface for an extended duration of time.

Example 2

The effects of temperature on the samples prepared according to Example 1 above were measured.

FIG. 5 shows comparative Thermal Gravimetric Analysis (TGA) plots for the control PEEK and PEG-silane coated inventive PEEK samples. The TGA was performed on the control PEEK and inventive PEG-Silane coated PEEK samples in the temperature range of 0 to 900° C. FIG. 5 shows minor difference between the thermal degradation of both the samples. At 150° C., the PEEK control sample displays a weight of 99.2%. At 150° C., the inventive PEG-silane coated PEEK sample displays a weight of 98.8%. A slightly more visible change of weight loss was observed for both samples at 500° C. with weight retention of 97.09% for the control PEEK sample, and 95.6% for the inventive PEG-silane coated PEEK sample. These results confirm that the PEG-silane coating has only a minor effect on the thermal properties of the PEEK material. Thus, the PEG-silane coating can be used for temperature sensitive applications.

Example 3

The effects of solvents on the bond strength of the samples prepared according to Example 1 above were measured.

Plasma treated and PEG-Silane coated PEEK (PTPSP) samples were prepared according to Example 1 above. Two PTPSP samples were bonded with epoxy. Three separate PTPSP-Epoxy-PTPSP composite structures were formed. One PTPSP-Epoxy-PTPSP composite structure was immersed in water for 6 hours. A second PTPSP-Epoxy-PTPSP composite structure was immersed in ethanol for 6 hours. A third PTPSP-Epoxy-PTPSP composite structure was not immersed in a liquid.

FIG. 6 is a stress-strain diagram of a PTPSP-Epoxy-PTPSP joint and the effect of water/ethanol immersion on the stress-strain curves. The figure shows that there was no significant change in the joint strength of the samples due to water/ethanol immersion.

Example 4

The bonding strength of different PEEK samples was evaluated.

Four different types of samples were prepared: (1) an untreated PEEK sample (P); (2) a plasma-treated PEEK sample (PTP); (3) a PEG-silane treated PEEK sample (PSP);

and (4) a plasma-treated and PEG-silane treated PEEK sample (PTPSP). The total length of each sample was 101.6±0.0254+L mm (where L is the joint length). The thickness of each sample was 4.76 mm. The width of each sample was 24.5±0.0254 mm. Two samples of the same type were bonded together using epoxy. A lap shear test was performed on the different contacting surfaces based on the ASTM D 3163 standards.

FIG. 7(a) is a stress-strain diagram showing the bond strength of different PEEK samples. FIG. 7(b) is a stress-strain diagram showing the bond strength of different PEEK samples immediately after plasma exposure and also 7 days after plasma exposure. As illustrated in FIG. 7(a), the P-epoxy-P composite structure exhibited a bond strength of 9.04 MPa. The PTP-epoxy-PTP composite structure exhibited a bond strength of 24.86 MPa. The PSP-epoxy-PSP composite structure exhibited a bond strength of 17.94 MPa. The PTPSP-epoxy-PTPSP composite structure exhibited a bond strength of 25.75 MPa. As illustrated in FIG. 7(b), 7 days after plasma exposure, the PTP-epoxy-PTP composite structure exhibited a bond strength of 14.3 MPa. The PTPSP-epoxy-PTPSP composite structure exhibited a bond strength of 24.93 MPa.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that embodiments of the disclosure are not to be limited to the specific embodiments disclosed and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A method of extending the shelf-life of an activated surface of a thermoplastic material, comprising:
   coating at least a portion of a surface of the thermoplastic material with at least one adhesion promoter to provide a coated surface; and
   treating the coated surface with plasma to provide the activated surface of the thermoplastic material;
   wherein the activated surface has a contact angle in the range of from about 0 to about 40°, and
   wherein the presence of the at least one adhesion promoter is effective to maintain the contact angle in the range of from about 0 to about 40° for a time of about 10 days or greater,
   wherein the at least one adhesion promoter is PEG-silane.

2. The method of claim 1, wherein the presence of the at least one adhesion promoter is effective to maintain the contact angle in the range of from about 0 to about 40° for a time of about 15 days or greater.

3. The method of claim 1 wherein the presence of the at least one adhesion promoter is effective to maintain the contact angle in the range of from about 0 to about 40° for a time of about 25 days or greater.

4. The method of claim 1, wherein the coated surface has an adhesion promoter coating layer having a thickness of from about 2 to about 12 microns.

5. The method of claim 1, wherein the thermoplastic material is polyether ether ketone.

6. A thermoplastic material having at least one activated surface prepared according to the method of claim 1.

7. A method of forming a thermoplastic composite structure, comprising:
   providing a first thermoplastic part and a second thermoplastic part;
   coating at least a portion of a surface of the first thermoplastic part with a coating layer comprising at least one adhesion promoter to provide a coated surface;
   drying the coating layer at a temperature of about 70 to 100° C. to thereby ensure stability of the coating layer;
   treating the coated surface with plasma to provide a first activated surface; and
   bonding the first thermoplastic part and the second thermoplastic part at the first activated surface with at least one adhesive to form the thermoplastic composite structure;
   wherein the first activated surface has a contact angle in the range of from about 0 to about 40°; and
   wherein the presence of the at least one adhesion promoter is effective to maintain the contact angle in the range of from about 0 to about 40° for a time of about 10 days or greater; and
   wherein the at least one adhesion promoter is PEG-silane.

8. The method of claim 7, wherein the thermoplastic composite structure has a bond strength of from about 20 to about 30 MPa.

9. The method of claim 7, wherein the at least one adhesive material is epoxy.

10. The method of claim 7, further comprising:
    coating at least a portion of a surface of the second thermoplastic part with at least one second adhesion promoter to provide a second coated surface; and then
    treating the second coated surface of the second thermoplastic part with plasma to provide a second activated surface; and then
    bonding the first thermoplastic part and the second thermoplastic part to create a bond, such that the first activated surface is adjacent to and facing the second activated surface at the bond;

wherein the second activated surface has a second contact angle in the range of from about 0 to about 40°; and wherein the presence of the at least one second adhesion promoter is effective to maintain the second contact angle in the range of from about 0 to about 40° for a time of about 10 days or greater.

11. The method of claim 7, wherein the first thermoplastic part comprises polyether ether ketone.

12. The method of claim 7, wherein the second thermoplastic part comprises polyether ether ketone.

13. A thermoplastic composite structure formed according to the method of claim 7.

14. The thermoplastic composite structure of claim 13, wherein the thermoplastic composite structure is configured for use in an aerospace vehicle.

* * * * *